United States Patent
Lu et al.

(10) Patent No.: US 6,703,173 B2
(45) Date of Patent: Mar. 9, 2004

(54) COLOR FILTERS FOR LIQUID CRYSTAL DISPLAY PANELS AND METHOD OF PRODUCING THE SAME

(75) Inventors: Chun Fu Lu, Hsinchu (TW); Fanny Shieh, Hsinchu (TW); Chin-Tai Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/098,855

(22) Filed: Mar. 13, 2002

(65) Prior Publication Data

US 2003/0099887 A1 May 29, 2003

(30) Foreign Application Priority Data

Nov. 23, 2001 (TW) .................. 90129105 A

(51) Int. Cl.⁷ .................. G02B 5/20; G02F 1/1335
(52) U.S. Cl. .................. 430/7
(58) Field of Search ................ 430/7; 349/106; 358/891

(56) References Cited

U.S. PATENT DOCUMENTS 5,641,595 A * 6/1997 Hsieh et al. ............... 430/7

FOREIGN PATENT DOCUMENTS

| JP | 1-229205 A | * | 9/1989 |
| JP | 4-158303 A | * | 6/1992 |
| JP | 7-239468 A | * | 9/1995 |

* cited by examiner

Primary Examiner—John A. McPherson
(74) Attorney, Agent, or Firm—Merchant & Gould P.C.

(57) ABSTRACT

A color filter for liquid crystal display panels. The filter includes a transparent substrate with a metal layer formed thereon, and a first color layer, a second colour layer and a third color layer are integrally formed with the same metal layer. The invention also provides a method for producing the color filter described above. The method applies the theory of oxidizing metal layers by repeatedly exposing and oxidizing to form a color filter having multiple integrally formed colors. Depending on requirements, the color filter of the invention also includes the black matrix that is often included in liquid crystal display panels.

31 Claims, 7 Drawing Sheets

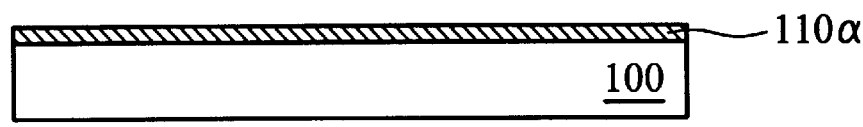
FIG. 2a
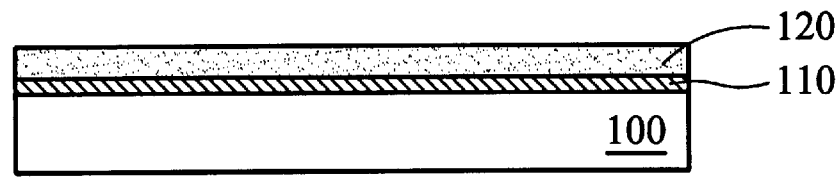
FIG. 2b
FIG. 2c
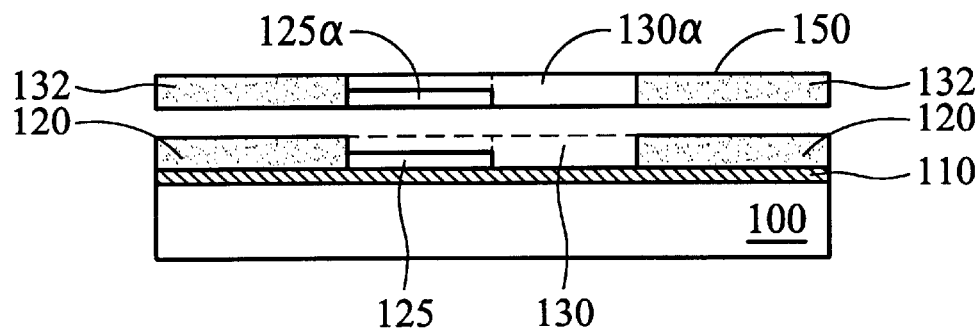
FIG. 2d

COLOR FILTERS FOR LIQUID CRYSTAL DISPLAY PANELS AND METHOD OF PRODUCING THE SAME

BACKGROUND OF THE INVENTION

1. Field of the Invention

The present invention relates to a color filter for liquid crystal display (LCD) panels, in particular, a color filter with integrally formed multicolor layer and a method of producing the same.

2. Description of the Prior Art

In general, conventional methods for producing color filters for LCD panels utilize various mechanisms to coat three primary colors (red, green and blue) onto predetermined positions of a substrate, followed by separation, filtration and the addition of adhesive. Examples of such methods includes printing, electro-deposition method, colorant dispersion, dyeing, ink-jet etc. The above-mentioned methods and their disadvantages are further discussed as follows:

(1) Printing method: Three primary colors are sequentially printed onto a substrate using a screen board. However it is difficult to control the positions of colors and the uniformity of the thickness of various colors.

(2) Electro-deposition method: Ground colorants are sequentially electro-deposited to predetermined positions by electrical-ionic dispersing agent. But, patterns of colors are limited due to the thickness of colorant affected by difficulty in controlling the uniformity of current.

(3) Colorant dispersion method: Non-ionic surfactant is used as dispersion agent for high molecular colorant to make a colored photosensitive agent. A substrate coated with the photosensitive agent is then subjected to photolithography to obtain expected colored areas. However, three courses of lithography are required, thereby increasing production costs.

(4) Dyeing method: A substrate coated with a dyeable photosensitive agent is exposed to obtain partitioned areas, followed by localized coloring to obtain expected color areas. However, this method exhibits reliability problems, such as deficiency of chemical resistance, heat resistance and litho-resistance.

(5) Ink-jet method: Shown in FIGS. 1a–1c, where 104 represents a substrate, 103 represents black matrix, 102 represents an ink-absorbing layer, and 101a–101c represent ink in different colors. In FIG. 1a, a substrate 104 is prepared for ink-jetting; and contact of ink with the substrate is shown in FIG. 1b. FIG. 1c illustrates the completion of colored substrate. In this method, a substrate is firstly coated with an ink-absorbing layer, followed by another smooth coating of photoresist agent in thick-film. Next, the substrate is subjected to photolithography to attain partitioned areas, followed by ink-jetting to obtain expected colored areas. In this method, three primary colors (red, green, blue) are printed onto the substrate simultaneously, thus the process time and costs for material are more economical than the colorant dyeing method. However, high molecular material is required as adhesion promoter or dispersion agent, which is mostly deficient in resistance to chemicals, heat and light.

In addition, in the above-mentioned methods, three colors are formed in repeated steps. Hence, gaps easily occur between different colors. Also, the thickness of colors is difficult to control. Consequently, there are problems in product quality.

SUMMARY OF THE INVENTION

In order to overcome the above problems, an object of the invention is to provide a color filter for LCD panels, in which the multicolor layer of the color filter is formed directly from the oxidization of a metal layer on the substrate, without high molecular material, such as dispersion agent, adhesion agent, and color-absorbing layer. As a result, deficiency in resistance to chemicals, heat and light is avoided.

It is another object of the invention to provide a color filter with high rate of windows, good reliability, and high resolution.

Another object of the invention is to provide a method to produce a color filter that causes less pollution and is low in production costs.

In order to achieve the above objects, there is provided a color filter for LCD panels, comprising a transparent substrate; and a metal layer formed on the substrate, wherein the metal layer contains integrally formed first color layer, second colour layer and third color layer.

Based on this invention, a method for producing a color filter with integrally formed multicolor layer is carried out by repeatedly exposing a transparent substrate coated with a metal layer with the aid of a photoresist layer to form different colors in the metal layer. The pattern of the photoresist layer is predetermined so that the different color layers are formed in the required positions. In the case where black matrix is necessary, it can be easily attained by further exposing the metal layer with another photoresist layer having the pattern of black matrix.

The present invention will become more fully understood from the detailed description given hereinbelow and the accompanying drawings, given by way of illustration only and thus not intended to be limitative of the present invention.

BRIEF DESCRIPTION OF THE DRAWINGS

FIGS. 2a–2h illustrate the process according to the $1^{st}$ Embodiment of the invention to produce a color filter without black matrix.

DETAILED DESCRIPTION OF THE INVENTION

Figure 1A:
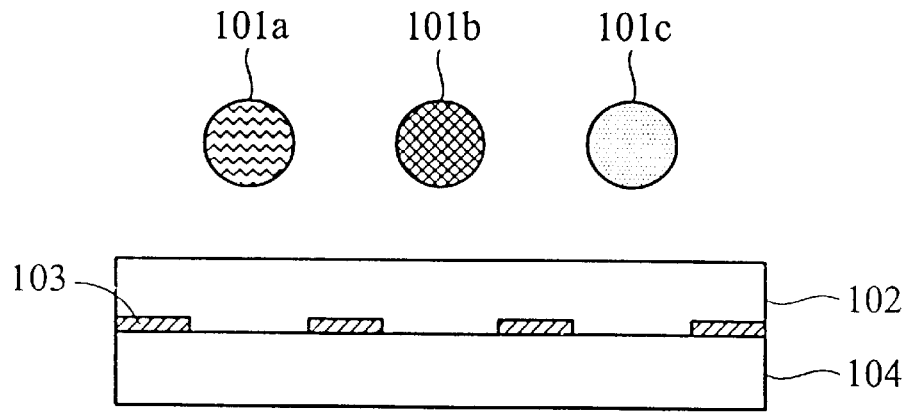
FIGS. 1a–1c illustrate the process of producing a color filter by conventional ink-jet method.
Figure 1B:
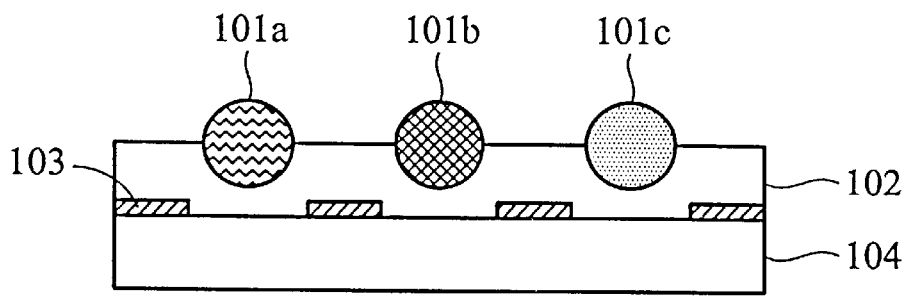
Figure 1C:
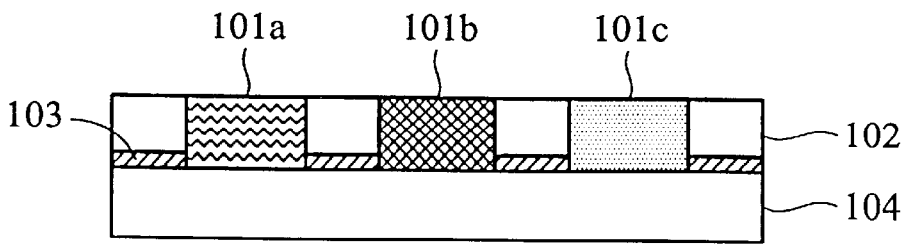

According to the invention, a color filter for liquid crystal display panels comprises a transparent substrate and a metal layer formed on the substrate, wherein a first color layer, a second color layer and a third color layer are integrally formed with the metal layer. In addition, black matrix can also be added in the positions between different colour layers with extra steps.

A method for producing a color filter for liquid crystal display panels comprises providing a transparent substrate, and forming a metal layer on the substrate, oxidizing the metal layer to form a first color layer, forming a positive photoresist layer on the first color layer, exposing selectively to form a completely exposed area, a partially exposed area and an unexposed area on the positive photoresist layer, entirely oxidizing the metal layer, removing the partially exposed area by entirely exposing and oxidizing again to form a second color layer from the first color layer corresponding to the partially exposed area of the positive photoresist layer and to form a third color layer in the metal layer corresponding to the completely exposed area of the positive photoresist layer, and removing the positive photoresist layer.

In the case where it is necessary to form black matrix, the above method further comprises the steps of: forming a photoresist layer on the first color layer, the second color layer and the third color layer, exposing selectively to form black matrix in the photoresist layer corresponding to the positions between different color layers, oxidizing integrally to form fourth color layers in the metal layer between different color layers, and removing the photoresist layer.

According to another embodiment of the invention, the method for producing a color filter for liquid crystal display panels comprising providing a transparent substrate, and forming a metal layer on the substrate, oxidizing the metal layer to form a first color layer, forming a positive photoresist layer on the first color layer, exposing selectively to form a completely exposed area, partially exposed area and unexposed area on the positive photoresist layer, entirely oxidizing the metal layer, removing the partially exposed area and exposing entirely again to form a second color layer from the first color layer corresponding to the partially exposed area of the positive photoresist layer and to form a third color layer in the metal layer corresponding to the completely exposed area of the positive photoresist layer, and removing the positive photoresist layer.

To form black matrix in the color filter, the following steps can be further performed: forming a photoresist layer on the first color layer, the second color layer and the third color layer; exposing selectively to form black matrix in the photoresist layer corresponding to the positions between different color layers; oxidizing integrally to form fourth color layers in the metal layer between different color layers; and removing the photoresist layer.

According to another embodiment of the invention, a method for producing a color filter for liquid crystal display panels comprises providing a transparent substrate, and forming a metal layer on the substrate, oxidizing the metal layer integrally to form a first color layer, forming a positive photoresist layer on the first color layer, exposing selectively to form a complete exposed area, a first exposed area, a second exposed area and unexposed area on the positive photoresist layer, wherein the exposure dose of the first exposed area is greater than that of the second exposed area, oxidizing the metal layer integrally, removing the first exposed area and reoxidizing, removing the second exposed area and reoxidizing to form a fourth color layer on the first color layer corresponding to the complete exposed area, a third color layer on the first color layer corresponding to the first exposed area and a second color layer on the first color layer corresponding to the second exposed area, and removing the remaining positive photoresist layer.

The preferable transparent substrate in this invention is glass or polymer, and metal layer is preferably Cr, Cu, Al, Fe or Ni, with a thickness of 60–5000 Å.

The method for producing a color filter for liquid crystal display panels of the invention mainly uses oxidation of metal to form different colors. Using oxidation of chromic acid as an example, blue, green, red and black are obtained based on the length of the reaction time of chromium in chromic acid.

According to the invention, colors of the color filter can also be achieved by other means, such as laser or high temperature oxidation, where the affect of the uniformity of current density on patterns can be avoided. In addition, the use of color photoresist agent is economized.

Furthermore, since the color layer of the color filter of the invention is oxidized directly from metal, there are no problems such as color mixing or leakage of light. Consequently, the optical quality of the color filter is greatly improved. In comparison to conventional processes, the invention provides a method that is superior in quality and production costs.

PREFERRED EMBODIMENTS $1^{st}$ Embodiment

Figure 2E:
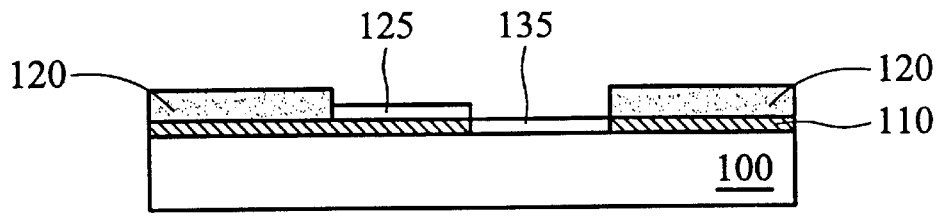

FIGS. 2a–2f illustrate the process according to the $1^{st}$ Embodiment of the invention to produce a color filter without black matrix. First, in FIG. 2a, a transparent substrate 100 is provided, followed by forming a Cr layer 110α by physical vapor deposition (PVD) on the substrate 100, as shown in FIG. 2b. Next, the Cr layer is completely oxidized to form a first color layer 110 (blue).

The formation of metal layer by PVD can be replaced with chemical vapor deposition (CVD) as well. The thickness of the Cr layer is at least a layer of Cr atom or Cr-containing alloy, within the range of 60–5000 Å. The transparent substrate is glass or polymer. As for the Cr layer, other metals such as Cu, Al, Fe and Ni are applicable as well. The oxidation step is performed by a strong acid, such as chromic acid, sulfuric acid, nitric acid or combinations thereof. A combination of chromic acid and sulfuric acid is used in this embodiment.

Then, in FIG. 2c, a positive photoresist layer 120 is formed on the first color layer 110. The positive photoresist layer is novolak resin, diazo compound or combinations thereof. In this embodiment, a commonly used photoresist agent containing novolak resin is used.

Next, a mask 150 with predetermined pattern is used for photolithography, as shown in FIG. 2d. The pattern of the mask is designed so that it contains three areas with different exposure (including a complete exposed area 130α, partially exposed area 125α and unexposed area 132). Suitable developing solution contains sodium carbonate, sodium hydrogencarbonate, sodium silicate, sodium hydroxide, potassium hydroxide and tetraalkyl amine compounds and combinations thereof. Sodium hydrogencarbonate is used in this embodiment.

After the above photolithography steps, a complete exposed area 130, partially exposed area 125 and unexposed area 120 are formed. Next, strong acid completes oxidization. At this time, the first color layer corresponding to the completely exposed area 130 is oxidized twice to form a third color layer 135, as shown in FIG. 2e.

Figure 2F:
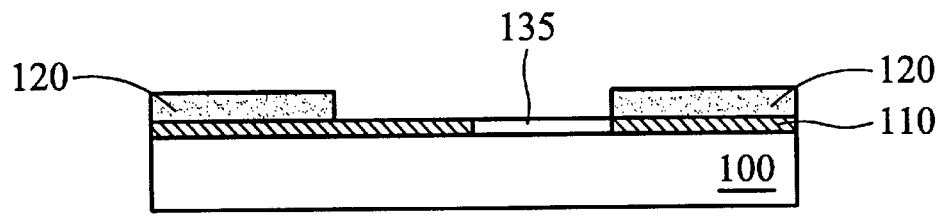
Figure 2G:
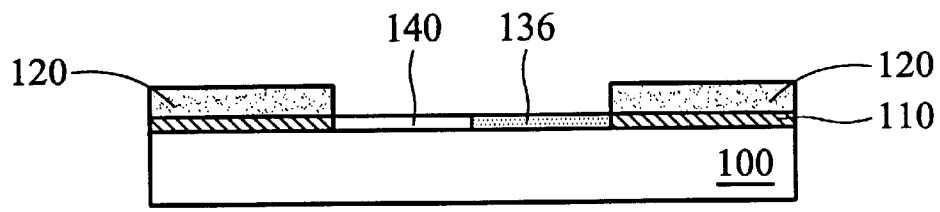
Figure 2H:
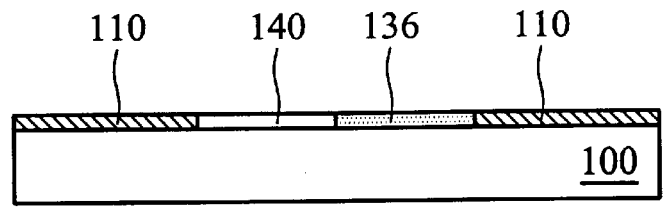

Then, the partially exposed area 125 of the positive photoresist layer is removed to reveal the first color layer corresponding to the partially exposed area, as shown in FIG. 2f. Strong acid is used again to complete oxidization. At this time, the first color layer corresponding to the partially exposed area is twice oxidized to form a second color layer 140 (green) and the third color layer 136 is oxidized three times to become red. The first color layer 110 located at both ends remain blue, shown in FIG. 2g. Three color layers are simulteneously obtained by the above repeated oxidation steps. Finally, the remaining positive photoresist layer 120 is removed to obtain a color filter with integrally formed three color layers: first color layer 110, second color layer 140 and third color layer 136.

Figure 3A:
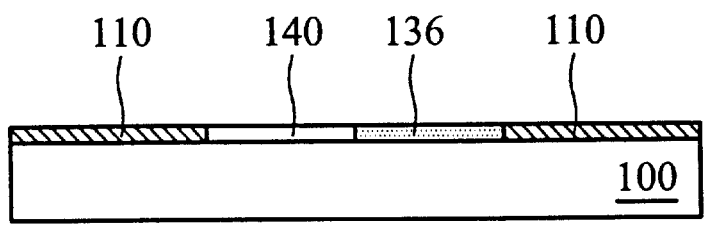
FIGS. 3a–3f illustrate the process according to the $1^{st}$ Embodiment of the invention to produce a color filter with black matrix.

The color filter obtained is then subjected to further steps to form black matrix. FIGS. 3a–3f illustrates the process to produce a color filter with black matrix, and FIG. 3a shows a transparent substrate 100 with three color layers 110, 136 and 140 formed on the surface.

Figure 3B:
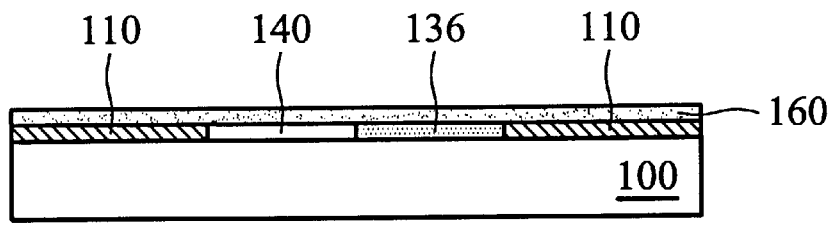
Figure 3C:
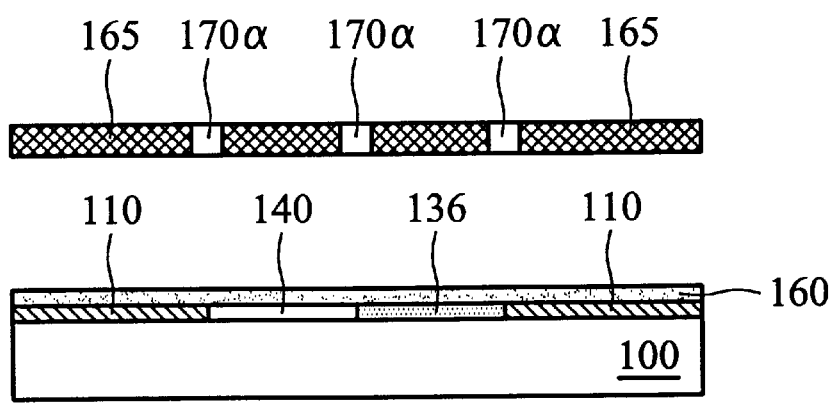
Figure 3D:
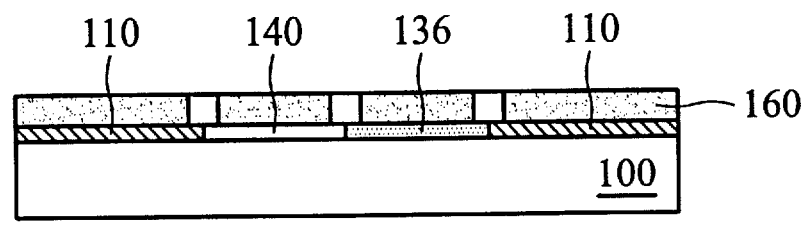

In FIG. 3b, an overall photoresist layer 160 is formed on the color layer. Next, a mask is used for photolithography. The mask has unexposed area 165 and complete exposed area 170α, as shown in FIG. 3c, where the complete exposed area is located between different color layers 110, 136 and 140. After photolithography, complete exposed areas 170 are formed on the photoresist layer 160, as shown in FIG. 3d. In this step, either positive or negative photoresist layer is applicable.

Figure 3E:
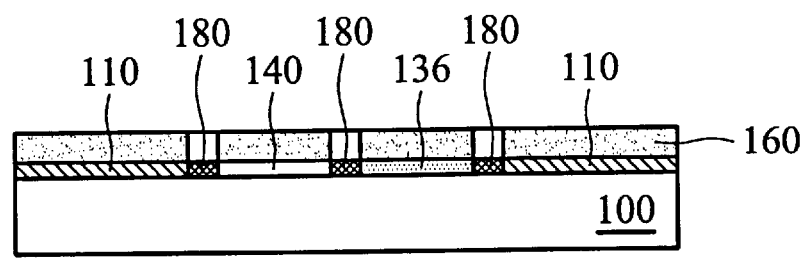
Figure 3F:
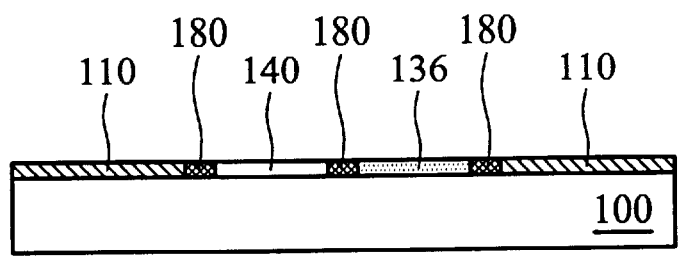

Oxidation with strong acid is then repeated to form black matrix 180 between different color layers 110, 136 and 140, as shown in FIG. 3e. Finally, a color filter with black matrix, shown in FIG. 3f, is obtained by removing the remaining photoresist layer 160.

$2^{nd}$ Embodiment

FIGS. 4a–4h illustrate the process according to the $2^{nd}$ Embodiment of the invention to produce a color filter. In this embodiment, details such as the thickness of the metal layer and the formation method thereof, developing solution and photoresist material are the same as those of the $1^{st}$ Embodiment.

Figure 4A:
FIGS. 4a–4h illustrate the process according to the $2^{nd}$ Embodiment of the invention to produce a color filter.
Figure 4B:
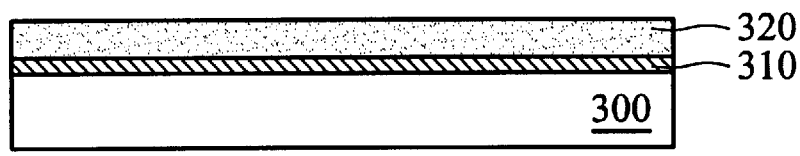

Firstly, in FIGS. 4a and 4b, a Cr layer was completely oxidized to form a first color layer 310 (blue) and a positive photoresist layer 320 is sequentially formed on a transparent substrate 300.

Figure 4C:
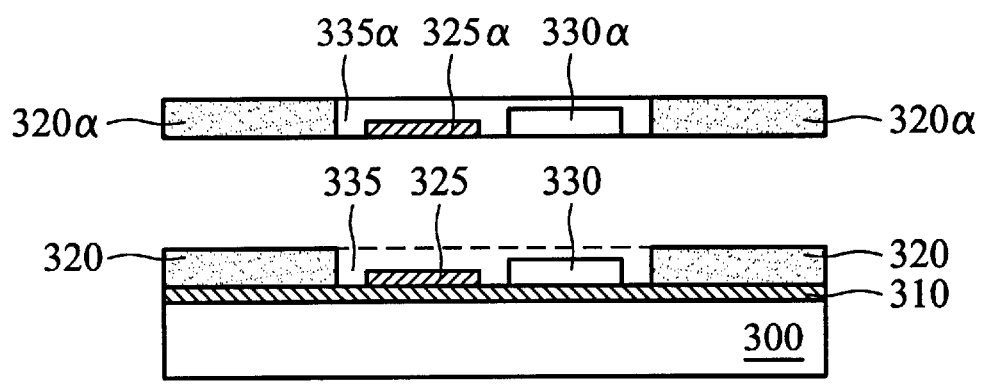

Then, as shown in FIG. 4c, a mask is used for photolithography. The pattern of the mask includes four areas of different exposures (completely exposed area 335α, a first partially exposed area 325α, a second partially exposed area 330α and an unexposed area 320α), where the exposure of the first partially exposed area is greater than that of the second partially exposed area. An alkali solution of sodium hydrogencarbonate is used as the developing solution.

Figure 4D:
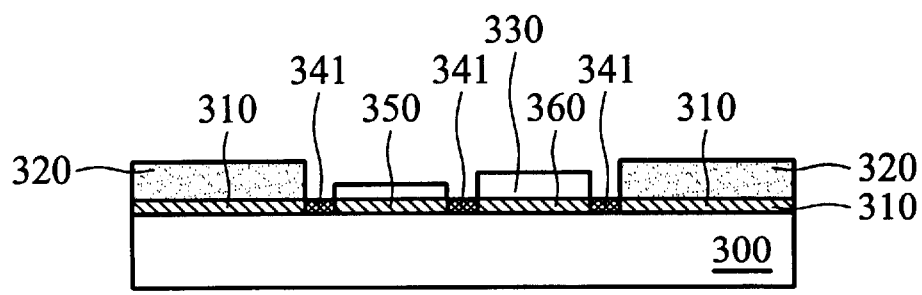

After the above photolithography steps, a complete exposed area 335, a first partially exposed area 325, a second partially exposed area 330 and an unexposed area 320 are formed on the positive photoresist layer. Next, as shown in FIG. 4d, overall oxidation is performed, so that an area of the first color layer corresponding to the complete exposed area 335 is twice oxidized to form a fourth color layer 341, leaving the areas 350, 360 not oxidized.

Figure 4E:
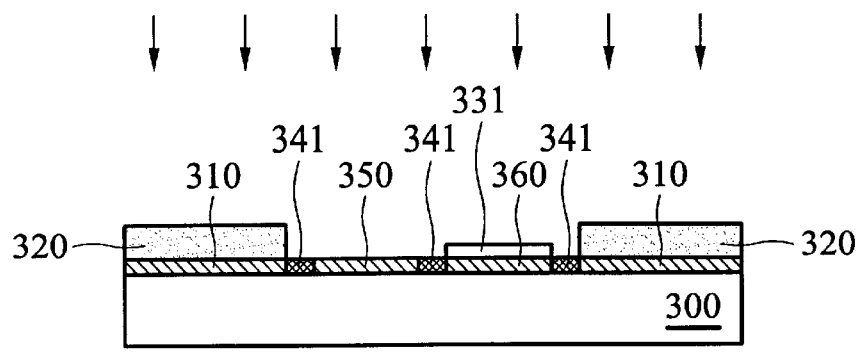
Figure 4F:
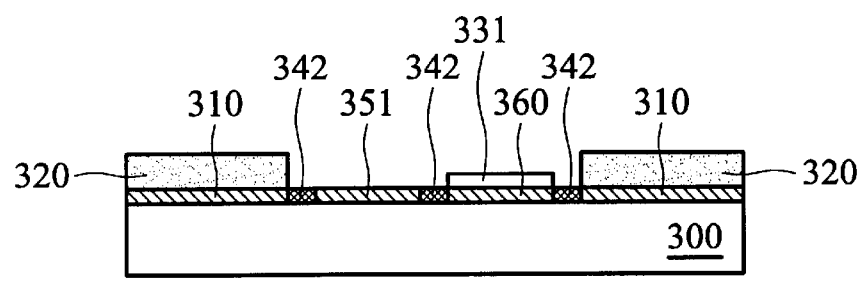

Next, the first partially exposed area 325 of the positive photoresist layer is removed to reveal the first color layer 350 corresponding to the first partially exposed area 325, shown in FIG. 4e. Again, an overall oxidation is performed so that the first color layer 350 corresponding to the first partially exposed area 325 is twice oxidized to form a third color layer 351, and the fourth color layer 342 is oxidized three times, shown in FIG. 4f. At this time, the first color layer 360 remains covered by the second partially exposed area 331.

Figure 4G:
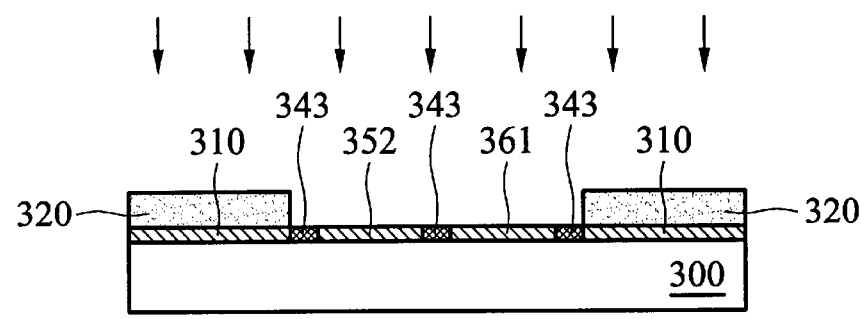
Figure 4H:
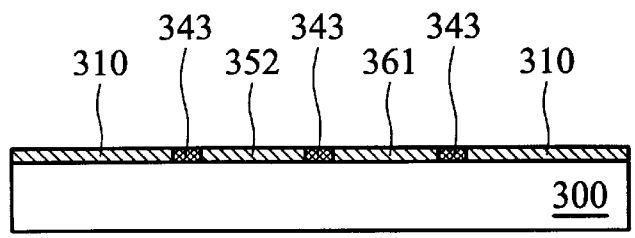

Then, as shown in FIG. 4g, the second partially exposed area 331 is removed, followed by an overall oxidation. At this time, the first color layer corresponding to the second partially exposed area 331 is oxidized twice to form a second color layer 361 (green), the third color layer is oxidized three times to become red, the fourth color layer 343 is oxidized four times to become black, and the first color layer 310 at both ends remain blue. Four colors are obtained after the steps repeated above. Finally, as shown in FIG. 4h, the remaining positive photoresist layer 320 is removed to obtain a color filter with four color layers (the first color 310, the fourth color layer 340, the third color layer 352 and the second color layer 361 formed integrally. The fourth color layer is the black matrix.

It is observed from the embodiments that different colors of the color filter of the invention are formed directly from the oxidation of metal. Since different colors are formed integrally, there is no mixing or disconnection of colors. The fourth color layer described in this invention refers to the black matrixm, which is often required in a color filter for liquid crystal display panels. When necessary, a coating for protection can be applied to protect against pollution or stop further oxidation.

Though the oxidation is done by strong acid in the embodiments, high temperature or laser are also applicable to provide necessary energy. In particular, laser exhibits the ability to reduce the partitions needed for lithography.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for producing a color filter for liquid crystal display panels, comprising:

providing a transparent substrate, and forming a metal layer on the substrate;

oxidizing the metal layer to form a first color layer;

forming a positive photoresist layer on the first color layer;

exposing selectively to form a completely exposed area, partially exposed area and unexposed area on the positive photoresist layer;

entirely oxidizing the metal layer;

removing the partially exposed area and oxidizing entirely again to form a second color layer from the first color layer corresponding to the partially exposed area of the positive photoresist layer and to form a third color layer in the metal layer corresponding to the completely exposed area of the positive photoresist layer; and removing the positive photoresist layer.

2. The method as claimed in claim 1, wherein the transparent substrate is glass or polymer.

3. The method as claimed in claim 1, wherein the metal is Cr, Cu, Al, Fe or Ni.

4. The method as claimed in claim 1, wherein the thickness of the metal layer is 60–5000 Å.

5. The method as claimed in claim 1, wherein the positive photoresist layer is novolak resin, diazo compound or combinations thereof.

6. The method as claimed in claim 1, wherein a solution used for developing contains sodium carbonate, sodium hydrogencarbonate, sodium silicate, sodium hydroxide, potassium hydroxide and tetraalkkyl amine compounds and combinations thereof.

7. The method as claimed in claim 1, wherein the oxidizing step is carried out by strong acids.

8. The method as claimed in claim 7, wherein the strong acids are chromic acid, sulfuric acid, nitric acid and combinations thereof.

9. The method as claimed in claim 1, wherein the oxidizing step is carried out by laser or high temperature.

10. The method as claimed in claim 1, wherein the metal layer is formed by physical vapor deposition (PVD) or chemical vapor deposition (CVD).

11. The method as claimed in claim 1, further comprising:
   forming a photoresist layer on the first color layer, the second color layer and the third color layer;
   exposing selectively to form black matrix in the photoresist layer corresponding to the positions between different color layers;
   oxidizing integrally to form fourth color layers in the metal layer between different color layers; and
   removing the photoresist layer.

12. The method as claimed in claim 11, wherein the transparent substrate is glass or polymer.

13. The method as claimed in claim 11, wherein the metal is Cr, Cu, Al, Fe or Ni.

14. The method as claimed in claim 11, wherein the thickness of the metal layer is 60–5000 Å.

15. The method as claimed in claim 11, wherein the positive photoresist layer is novolak resin, diazo compound or combinations thereof.

16. The method as claimed in claim 11, wherein a solution used for developing contains sodium carbonate, sodium hydrogencarbonate, sodium silicate, sodium hydroxide, potassium hydroxide and tetraalkyl amine compounds and combinations thereof.

17. The method as claimed in claim 11, wherein the oxidizing step is carried out by strong acids.

18. The method as claimed in claim 17, wherein the strong acids are chromic acid, sulfuric acid, nitric acid and combinations thereof.

19. The method as claimed in claim 11, wherein the oxidizing step is carried out by laser or high temperature.

20. The method as claimed in claim 11, wherein the metal layer is formed by physical vapor deposition (PVD) or chemical vapor deposition (CVD).

21. A method for producing a color filter for liquid crystal display panels, comprising:
   providing a transparent substrate, and forming a metal layer on the substrate;
   oxidizing the metal layer integrally to form a first color layer;
   forming a positive photoresist layer on the first color layer;
   exposing selectively to form a complete exposed area, a first exposed area, a second exposed area and unexposed area on the positive photoresist layer, wherein the exposure of the first exposed area is greater than that of the second exposed area;
   oxidizing the metal layer integrally;
   removing the first exposed area and reoxidizing;
   removing the second exposed area and reoxidizing to form a fourth color layer on the first color layer corresponding to the complete exposed area, a third color layer on the first color layer corresponding to the first exposed area and a second color layer on the first color layer corresponding to the second exposed area;
   removing the remaining positive photoresist layer.

22. The method as claimed in claim 21, wherein the transparent substrate is glass or polymer.

23. The method as claimed in claim 21, wherein the metal is Cr, Cu, Al, Fe or Ni.

24. The method as claimed in claim 21, wherein the thickness of the metal layer is 60–5000 Å.

25. The method as claimed in claim 21, wherein the positive photoresist layer is novolak resin, diazo compound or combinations thereof.

26. The method as claimed in claim 21, wherein a solution used for developing contains sodium carbonate, sodium hydrogencarbonate, sodium silicate, sodium hydroxide, potassium hydroxide and tetraalkkyl amine compounds and combinations thereof.

27. The method as claimed in claim 21, wherein the oxidizing step is carried out by strong acids.

28. The method as claimed in claim 21, wherein the strong acids are chromic acid, sulfuric acid, nitric acid and combinations thereof.

29. The method as claimed in claim 21, wherein the oxidizing step is carried out by laser or high temperature.

30. The method as claimed in claim 21, wherein the metal layer is formed by physical vapor deposition (PVD) or chemical vapor deposition (CVD).

31. The method as claimed in claim 21, wherein the fourth color layer is black matrix.

* * * * *